Sept. 16, 1941. W. A. McMILLAN 2,256,405
RECONDITIONING OF ABSORPTION OILS
Filed Dec. 5, 1939
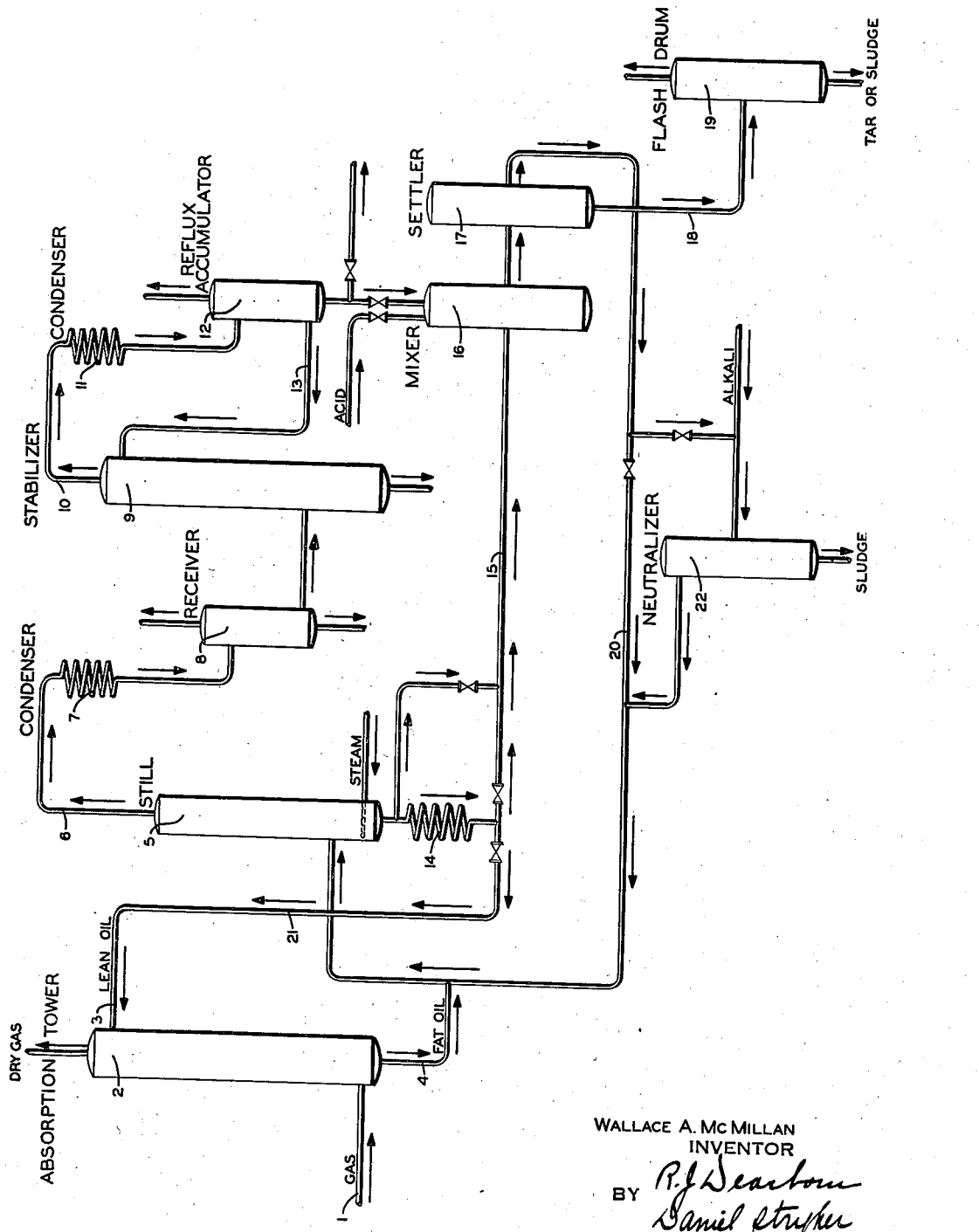
WALLACE A. McMILLAN
INVENTOR
BY
HIS ATTORNEYS Patented Sept. 16, 1941

2,256,405

UNITED STATES PATENT OFFICE 2,256,405

RECONDITIONING OF ABSORPTION OILS

Wallace A. McMillan, Elmhurst, N. Y., assignor to The Texas Company, New York, N. Y., a corporation of Delaware Application December 5, 1939, Serial No. 307,558

5 Claims. (Cl. 196—8)

This invention relates to the absorption of gaseous hydrocarbons and particularly concerns a method of absorption involving continuous purification of the absorption menstruum.

The invention broadly contemplates a continuous absorption process which involves absorbing gaseous hydrocarbons in an absorption menstruum, such as oil, separating the absorbed hydrocarbons from the enriched menstruum, returning the lean menstruum to the cycle to absorb more hydrocarbons, and continuously treating at least a portion of the returning menstruum with a solvent adapted to precipitate therefrom tarry impurities.

The impurities so removed comprise tars and heavy gummy polymeric compounds. These impurities accumulate in the menstruum during the absorption process and as they accumulate they progressively decrease the absorptive power of the menstruum. In addition, this tarry and gummy material is deposited, to a substantial extent, upon the apparatus. The deposition of this tarry material in the heaters and heat exchange equipment is particularly objectionable because it greatly decreases the efficiency of heat interchange.

Accordingly, the present invention has to do with the continuous removal of tarry material from the absorption menstruum so that the same menstruum may be re-used continuously without the necessity for substituting fresh absorption liquid at frequent intervals.

The present invention contemplates effecting purification of the absorption liquid by treatment with a solvent comprising a liquefied normally gaseous hydrocarbon, such as propane, in proportion and at temperatures such that the tarry material is precipitated from the absorption liquid.

The invention also contemplates using as the purifying solvent a liquefied normally gaseous petroleum fraction segregated from the gaseous hydrocarbons recovered in the absorption process.

In order to describe the invention more fully reference will now be made to the accompanying drawing illustrating one method of carrying out the invention.

Gas containing normally liquid petroleum hydrocarbons, and which it is desired to recover, is conducted from a source not shown through a pipe 1 leading to the lower portion of an absorption tower 2. The tower 2 comprises a vertical vessel containing a suitable contacting material. Raschig rings, bubble trays, or other conventional means for effecting intimate contact between gas and liquid may be used.

The gas flows upwardly through the tower and in doing so comes into countercurrent contact with the absorption menstruum introduced to the upper portion of the tower through a pipe 3. This menstruum usually comprises a hydrocarbon liquid fraction, such as kerosine, or a low boiling gas oil.

The absorption oil absorbs from the gas all the normally liquid hydrocarbons that may be present, together with substantial proportions of the butane, propane, and ethane, which are present. The unabsorbed gas, comprising fixed gases, is discharged from the top of the absorption tower and may be disposed of as fuel or in other ways.

The enriched absorption oil is drawn off from the bottom of the tower 2 through a pipe 4 and conducted to a still 5. In this still the absorbed hydrocarbons, ethane, propane, butane and hexane, are vaporized from the absorption oil. The vaporized hydrocarbons are removed through a pipe 6 and condenser 7 to a receiving drum 8, wherein fixed gases may be vented off. Steam condensate, resulting from the use of steam in the still 5 is also drawn off from the drum 8.

The hydrocarbons remaining in the drum 8 are conducted to a stabilizer 9 wherein they are subjected to fractionation. Advantageously, a light fraction predominantly propane, but consisting of a mixture of propane and some ethane with a small amount of butanes, is separated and removed through a pipe 10 and condenser 11, and is collected in an accumulator 12. A portion of the accumulated condensate is continuously returned to the top of the stabilizer through a pipe 13 and provides reflux cooling for the top of the stabilizer.

The fraction removed from the bottom of the stabilizer comprises all the hydrocarbons higher boiling than butane and a substantial proportion of the butanes originally absorbed. It normally contains little or no propane.

The unvaporized liquid accumulating in the bottom of the still 5 comprises the absorption oil containing absorbed tarry material. It is drawn off from the still through a cooler 14, although a small proportion of it may be by-passed around the cooler directly to a pipe 15.

At least a substantial portion of the withdrawn oil is conducted through the pipe 15 to a mixer 16. In the mixer 16 the absorption oil containing impurities is mixed with a suitable proportion of the hydrocarbon fraction accumulating in the accumulator 12. For example, one part by volume of the oil may be mixed with out 4 to 15 parts of the propane fraction. The resulting mixture is passed to a settler 17 wherein it is submitted to settling at a temperature of around 135 to 195° F. The desired temperature may be obtained by adjusting the amount of hot, lean oil flowing through the above mentioned by-pass. As a result of such settling the tarry material is precipitated from the oil and is withdrawn from the bottom of the settler through a pipe 18 and through which it is conducted to a still or flash drum 19. The propane solvent present is stripped from the tarry material and recovered for recycling to the process or for other disposal.

The separated tar is withdrawn and may be disposed of in various ways. For example, it may be utilized as a road oil or constituent thereof, or as a constituent of asphaltic products.

The solution of absorption oil in propane solvent, from which the tarry material has been precipitated, is drawn off from the top of the settler 17 through a pipe 20 and through which it is returned to the still 5, previously referred to. Upon return to the still the propane is stripped therefrom and recovered, along with the hydrocarbons being continuously stripped from the enriched oil.

That portion of the absorption oil not drawn off to the mixer 16 is returned directly through pipe 21 communicating with pipe 3 previously referred to.

It is contemplated that in actual practice a comparatively small proportion of the lean absorption oil issuing from the bottom of the still 5 is passed to the mixer 16 for purification. For example, the proportion of lean oil diverted to the purifying step may comprise around 0.1 to 5% of the total volume of absorption oil in the system. However, the actual proportion so diverted may vary considerably from this, depending upon the extent to which impurities are present.

The stabilizer 9 and accumulator 12 are operated under sufficient pressure so as to maintain the propane fraction in a liquid state. If desired, the propane fraction required for the subsequent purification step may be removed from the stabilizer as a side stream. The propane fraction advantageously contains an appreciable amount of ethane, as, for example, around 5 to 35% by volume. Such a mixture provides an effective liquid for precipitating the tarry constituents from the absorption oil.

Moreover, it may be advantageous to carry out the precipitation of tarry material in the presence of a small amount of a mineral acid, such as sulphuric acid of about 90 to 98% concentration. The amount of acid used may be around 0.5 to 5 pounds per barrel of absorption oil being treated. If acid is used, provision should be made for its subsequent removal and also for the neutralization of the purified oil in a neutralizing vessel 22.

While certain proportions of solvent to oil, as well as certain treating temperatures, have been mentioned above in connection with the purifying step, it is contemplated that some variation may be necessary. For example, the treatment may be effected at a temperature nearer the critical (204° F.) for the propane solvent.

The process described above is particularly adapted to the separation and recovery of gasoline from natural gas or to the recovery of gasoline constituents from refinery gases. It may also be applied, however, to the extraction of absorbable constituents from other complex gas mixtures.

Obviously many modifications and variations of the invention, as hereinbefore set forth may be made without departing from the spirit and scope thereof, and therefore only such limitations should be imposed as are indicated in the appended claims.

I claim:

1. A process of recovering normally gaseous petroleum hydrocarbons, including propane, from a gas mixture by absorption, which comprises continuously absorbing said hydrocarbons in an absorption oil to produce an enriched oil, passing the enriched oil to a still, subjecting the enriched oil to distillation therein to remove absorbed hydrocarbons, withdrawing lean oil from which the hydrocarbons have been removed, segregating from the removed absorbed hydrocarbons a liquefied fraction comprising predominantly propane, mixing at least a portion of the absorption oil from which the absorbed hydrocarbons have been removed with said segregated fraction in amount sufficient to precipitate tarry constituents contained therein, maintaining the mixture at a temperature substantially above atmospheric, removing the resulting precipitate, mixing the remaining solution of purified absorption oil in solvent with the enriched oil passing to said still, subjecting the mixture to distillation to effect simultaneous vaporization of normally gaseous hydrocarbons from both the purified oil and the enriched oil, and returning the lean absorption oil, including that from which tarry constituents have been removed, to the absorption cycle.

2. A continuous process for recovering normally gaseous gasoline hydrocarbons including ethane and its homologs from a gas mixture containing them which comprises continuously absorbing said normally gaseous hydrocarbons in a petroleum oil boiling within the range of kerosene and light gas oil, passing the enriched oil to a still, vaporizing the absorbed hydrocarbons from the oil, withdrawing the lean oil, subjecting the vaporized hydrocarbons to fractionation, separating from the vaporized hydrocarbons a light fraction consisting essentially of propane and ethane, the ethane amounting to around 5–35% by volume of the fraction, mixing said light fraction with at least a portion of said withdrawn lean oil in the proportion of about 4–15 parts to 1 part of lean oil by volume, subjecting the mixture to settling at a temperature of around 135–195° F. to precipitate tarry matter, removing the precipitate, mixing the remaining solution of purified oil with enriched oil passing to said still, subjecting the mixture to distillation to effect simultaneous vaporization of normally gaseous hydrocarbons from the purified oil and the enriched oil and returning the lean oil, including the purified portion to the absorption cycle.

3. The method according to claim 2 in which the tarry constituents are precipitated from the absorption oil in the presence of a small amount of mineral acid not in excess of about 5 lbs. per barrel of absorption oil.

4. A process of recovering normally gaseous petroleum hydrocarbons including propane from a gas mixture by absorption which comprises continuously absorbing said hydrocarbons in an absorption oil to produce an enriched oil, passing the enriched oil to a zone of fractional distillation, subjecting the enriched oil to fractional distillation therein to separate it into a fraction comprising predominantly propane, a second fraction comprising absorbed gasoline hydrocarbons of higher molecular weight than propane and a third fraction comprising lean absorption oil from which the absorbed hydrocarbons have been removed, mixing at least a portion of the lean absorption oil with said propane fraction in amount sufficient to precipitate tarry constituents contained therein, maintaining the mixture at a temperature substantially above atmospheric, removing the resulting precipitate, mixing the remaining solution of purified absorption oil in solvent with the enriched oil passing to said zone of fractional distillation wherein simultaneous vaporization of normally gaseous hydrocarbons from both the purified oil and the enriched oil is effected, and returning the lean absorption oil including that from which tarry constituents have been removed to the absorption zone.

5. A continuous process for recovering normally gaseous gasoline hydrocarbons including ethane and its homologs from a gas mixture containing them which comprises continuously absorbing said normally gaseous hydrocarbons in a petroleum oil boiling within the range of kerosene and light gas oil, passing the enriched oil to a zone of fractional distillation, subjecting the enriched oil to fractional distillation therein to separate it into a fraction consisting essentially of propane and ethane, the ethane amounting to around 5 to 35% by volume of the fraction, a second fraction comprising absorbed gasoline hydrocarbons of higher molecular weight than propane, and a third fraction comprising lean absorption oil from which the absorbed hydrocarbons have been removed, mixing said propane-ethane fraction with at least a portion of said lean oil in the proportion of about 4-15 parts of propane-ethane to 1 part of lean oil by volume, subjecting the mixture to settling at a temperature of around 135-195° F. to precipitate tarry matter, removing the precipitate, mixing the remaining solution of purified oil with enriched oil passing to said zone of fractional distillation wherein simultaneous vaporization of normally gaseous hydrocarbons from both the purified oil and the enriched oil is effected, and returning the lean oil including the purified portion to the absorption zone.

WALLACE A. McMILLAN.